(12) United States Patent
Baker et al.

(10) Patent No.: US 7,747,044 B2
(45) Date of Patent: Jun. 29, 2010

(54) FUSING MULTIMODAL BIOMETRICS WITH QUALITY ESTIMATES VIA A BAYESIAN BELIEF NETWORK

(75) Inventors: John P. Baker, Ellicott City, MD (US); Donald E. Maurer, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 829 days.

(21) Appl. No.: 11/625,446

(22) Filed: Jan. 22, 2007

(65) Prior Publication Data

US 2007/0172114 A1 Jul. 26, 2007

Related U.S. Application Data

(60) Provisional application No. 60/760,819, filed on Jan. 20, 2006.

(51) Int. Cl.
*G06K 9/00* (2006.01)
*G06F 21/00* (2006.01)

(52) U.S. Cl. ............... 382/116; 340/5.53; 340/5.83; 713/186; 902/3

(58) Field of Classification Search ......... 382/115–127; 340/5.1, 5.2, 5.8–5.86; 356/71; 713/186; 902/3
See application file for complete search history.

(56) References Cited

U.S. PATENT DOCUMENTS

| | | | | |
|---|---|---|---|---|
| 5,502,774 | A * | 3/1996 | Bellegarda et al. ........... | 382/159 |
| 5,621,809 | A * | 4/1997 | Bellegarda et al. ........... | 382/116 |
| 7,092,553 | B2 * | 8/2006 | Kuepper et al. .............. | 382/116 |
| 7,287,013 | B2 * | 10/2007 | Schneider et al. ............. | 706/15 |
| 7,440,929 | B2 * | 10/2008 | Schneider et al. ............. | 706/15 |
| 7,558,765 | B2 * | 7/2009 | Kiefer ......................... | 706/15 |
| 2003/0031348 | A1 * | 2/2003 | Kuepper et al. ............. | 382/116 |
| 2005/0238207 | A1 * | 10/2005 | Tavares ...................... | 382/115 |
| 2005/0265607 | A1 * | 12/2005 | Chang ........................ | 382/224 |
| 2006/0093208 | A1 * | 5/2006 | Li et al. ...................... | 382/159 |
| 2006/0204049 | A1 * | 9/2006 | Schneider et al. ........... | 382/115 |
| 2007/0172114 | A1 * | 7/2007 | Baker et al. ................. | 382/160 |
| 2008/0104006 | A1 * | 5/2008 | Kiefer ......................... | 706/48 |
| 2009/0171623 | A1 * | 7/2009 | Kiefer ......................... | 702/181 |
| 2009/0232361 | A1 * | 9/2009 | Miller ......................... | 382/115 |
| 2009/0289760 | A1 * | 11/2009 | Murakami et al. ......... | 340/5.82 |
| 2010/0046806 | A1 * | 2/2010 | Baughman et al. .......... | 382/115 |

OTHER PUBLICATIONS

Dass et al., "A Principled Approach to Score Level Fusion in Multimodal Biometric Systems", Proceeding of AVBPA 2005.*

Bigun et al., "Expert Conciliation for Multi Modal Person Authentication Systems by Bayesian Statistics", Springer, Lecture Notes in Computer Science, 1997.*

Veeramachaneni et al., "Adaptive Multimodal Biometric Fusion Algorithm Using Particle Swarm", 2003.*

(Continued)

*Primary Examiner*—Aaron W Carter
(74) *Attorney, Agent, or Firm*—Aisha Ahmad (57) ABSTRACT

A Bayesian belief network-based architecture for multimodal biometric fusion is disclosed. Bayesian networks are a theoretically sound, probabilistic framework for information fusion. The architecture incorporates prior knowledge of each modality's capabilities, quality estimates for each sample, and relationships or dependencies between these variables. A global quality estimate is introduced to support decision making.

26 Claims, 7 Drawing Sheets

OTHER PUBLICATIONS

Ryu et al., "Super-Template Generation Using Successive Bayesian Estimation for Fingerprint Enrollment", 2005.*

Jain et al., "Score Normalization in Multimodal Biometric Systems", Oct. 21, 2004.*

Jain, Anil K. et al., Combining Multiple Matchers for a High Security Fingerprint Verification System, Pattern Recognition Letters 20 (1999) 1371-1379, Elsevier Science B.V., East Lansing, MI.

Ross, Arun, et al., Information Fusion in Biometrics, pp. 354-359, Springer-Verlag Berlin Heidelberg 2001.

Poh, et al. Database, Protocol and Tools for Evaluating Score-Level Fusion Algorithms in Biometric Authentication, IDIAP Research Report, New York, Aug. 2004.

* cited by examiner

(a) Impact of Local Quality (b) Global Quality Profile

FUSING MULTIMODAL BIOMETRICS WITH QUALITY ESTIMATES VIA A BAYESIAN BELIEF NETWORK

CROSS-REFERENCE TO RELATED APPLICATIONS

This application is based on and claims priority to U.S. Provisional Application No. 60/760,819, filed Jan. 20, 2006, the entire contents of which are hereby incorporated by reference.

BACKGROUND OF THE INVENTION

1. Field of the Invention

This invention relates to the field of biometrics and, more particularly, to the field of fusing multi-modal biometrics.

2. Discussion of the Related Art

Biometrics is the study of using intrinsic physical characteristics of a human being to identify or verify the identity of an individual human. Examples of these physical or biometric characteristics include fingerprints (more generally, friction ridges), speaker (voice) identification, iris matching, hand geometry or hand vein comparison, and DNA testing. Each specific biometric measurement type is typically termed a "modality". Multi-biometric fusion is the action of combining the results of multiple measurements of the same (e.g., left and right iris) or differing (e.g., thumbprint, iris, and voice patterns) modalities to increase the identification performance of a biometric identification or verification system over that of a single measurement or single modality system.

One problem with combining biometric information from multiple sources is that typically the scoring methods and units used with a one type of biometric sample differ from that of another. For example, a device used for scanning irises for identity verification might compare a particular scanned iris with a database of known identified irises and generate a "match/no match" score of 70 on a scale of 1-100, with a higher number indicating a higher likelihood of there being a match. Another sample, e.g., a fingerprint sample taken by a particular device, may generate a match/no match score of 0.9, on a scale of 0-1, with the higher number indicating a higher likelihood of a match. Since different units and different scales may be used, difficulties obviously arise when trying to combine the data into a meaningful and useful result.

Current multi-biometric systems tend to treat each modality equally using simple score summing or binary decision-level fusion, and these systems have error rates that make large-scale operation difficult. Even a $1/1000$ chance of an incorrect identity results in thousands of erroneous matches when querying databases with millions of entries. This can be particularly troublesome in high security applications that require extremely high precision (e.g., a false alarm rate less than one percent) (See A. K. Jain, S. Prabhakar, and S. Chen, *Combining multiple matchers for a high security fingerprint verification system*, Pattern Recognition Letters 20 (1999) 1371-1379).

To address the high-precision needs of high security applications, fusing multiple biometrics has been considered to help lower error rates (See A. Ross, A. K. Jain, *Information Fusion in Biometrics*, Pattern Recognition Letters 24, (2003) 2115-2125). Some fingerprint systems, for example, use all available impressions sequentially until an acceptable match is obtained, while others include logical (AND, OR) operations, summation of similarity scores, or can be viewed as a consensus of experts. More sophisticated methods have been considered for combining scores from separate classifiers for each biometric modality using different feature extraction and matching algorithms to generate their scores (Jain et al., supra; J. Kittler, et al., *On combining classifiers*, IEEE Trans. Pattern Anal. and Mach. Intell., 20(3) (1998) 226-239; J. Bigun, et al., *Multimodal Biometric Authentication using Quality Signals in Mobile Communications*, in: Proc. of IAPR Intl. Conf. on Image Analysis and Processing (ICIAP), IEEE CS Press, (2003) 2-13).

Recently, Rukhin and Malioutov (A. L. Rukhin, and I. Malioutov, *Fusion of biometric algorithms in the recognition problem*, Pattern Recognition Letters, 26 (2005) 679-684) proposed fusion based on a minimum distance method for combining rankings from several biometric algorithms. Researchers have also developed quality metrics which are often used as weights for optimally combining scores generated by multiple classifiers (J. Fierrez-Aguilar, et al., *Kernel-based multimodal biometric verification using quality signals*, in: Biometric Technology for Human Identification, Jain, A. K., and N. K. Ratha (Eds.), Proc. SPIE Vol. 5404, 2004, pp. 544-554; E. Tabassi, C. Wilson, C. Watson, *Fingerprint Image Quality*, Technical Report 7151, 2004; Bigun et al., supra; Y. Chen, S. Dass, and A. J. Jain, *Fingerprint Quality Indices for Predicting Authentication Performance*, AVBPA 2005, LNCS 3546 (2005) 160-170; L. M. Wein, and M. Baveja, *Using Fingerprint Image Quality To Improve The Identification Performance Of The U.S. Visitor And Immigrant Status Indicator Technology Program*, Proceedings of the National Academy of Science, 102(21) (2005) 7772-7775).

While each of the above techniques provide some beneficial results, they do not effectively utilize all of the information available to a score-level fusion system, including score values, quality estimates, and score distribution statistics.

SUMMARY OF THE INVENTION

The present invention improves the matching performance of known multi-biometric systems by taking advantage of the relative utility of the various biometric modalities. The present invention utilizes a Bayesian Belief Network (BBN) biometric fusion engine to provide significantly lower error rates than known techniques. By significantly lowering the error rates, large-scale biometric identifiers are made more feasible.

In accordance with the present invention, different data scores obtained from each biometric modality are normalized by performing statistical analysis on the data scores and determining a probability of match for each of the scores. Since these probability scores will be in the same unit and scale, regardless of the data from which they were derived, a normalized score, i.e., a probability, is determined and the data is then easily fusible. Better (higher quality) data tend to be weighted more heavily by virtue of its having a higher probability of being accurate.

Further, using the present invention, looking at observed data and its scores, it is possible to look at the statistical distribution of "true matches" and determine if they follow a parametric distribution pattern, e.g., log normal or beta type distributions, and that non-matched data follows a different distribution pattern. This allows each to be characterized by summary statistics such as the mean and standard deviation. Since they are very different distributions, using the present invention, this knowledge of the characteristics of "match" scores versus "no match" scores allows better inferences to be made. Since different distributions are obtained depending on the match or non-match status of the data, the differences can be modeled parametrically (rather than empirically), providing improved results, especially in cases with matching/non-matching scores at the fringes of the score distributions.

Using the present invention with actual data allows training using relatively sparse databases. The parametric distributions, like the log normal and beta distributions, are characterized completely by their mean and standard deviations. So if it is possible to estimate of mean and standard deviation of the measurements taken by a given device for matches and non-matches, it is possible to actually characterize, to a high degree, the total behavior of these devices for matching and non-matching any data input to it.

DETAILED DESCRIPTION OF THE PREFERRED EMBODIMENTS

The present invention comprises a BBN-based architecture for biometric fusion applications. Bayesian networks provide a unified probabilistic framework for information fusion. As used herein, the term "Bayesian Belief Network" and "Bayes Net" are used interchangeably and describe a probabilistic formulation used for fusing information from multiple measurements. A "biometric fusion engine" as used herein describes a processor or hardware-based mechanism for fusing biometric information from multiple measurements. Although Bayesian methods have been used in biometrics (Bigun et al., supra; J. Richiardi, P. Prodanov, and A. Drygajlo, A Probabilistic Measure of Modality Reliability in Speaker Verification, in Proc. IEEE International Conference on; A. B. J. Teoh, S. A. Samad, and A. Hussain, A Face and Speech Biometric Verification System Using a Simple Bayesian Structure, Journal of Information Science and Engineering, 21 (2005) 1121-1137), their capabilities have not been fully exploited. The BBN-based architecture of the present invention processes multiple signatures from a single biometric or a set of multimodal biometric signatures within the framework of a single classifier. It can model modality characteristics and dependencies on quality through the form of its conditional probabilities, which are determined from training data. The present invention also introduces a concept of global quality which allows the decision-maker to call for re-sampling or to report the result as uncertain, rather than as a non-match as may occur otherwise.

Figure 1:
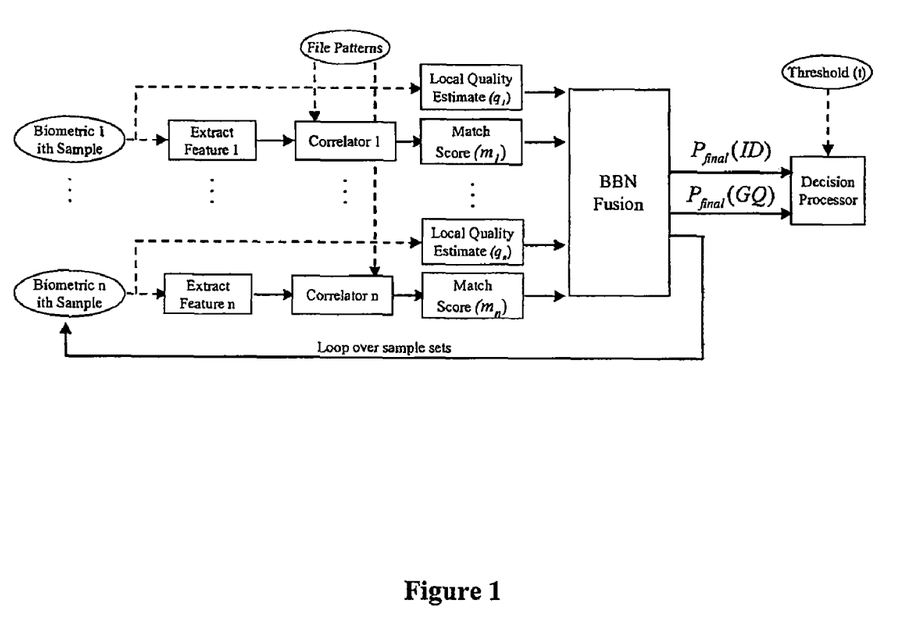
FIG. 1 illustrates an example of a BBN architecture in accordance with the present invention.

FIG. 1 illustrates an example of a BBN architecture in accordance with the present invention. The architecture shown in FIG. 1 can be adapted for inputs consisting of multiple samples of the same biometric, or multiple biometrics. Depending on the biometric, features can include fingerprint minutia, ridge counts, a vector of cepstral coefficients, and the like. Each feature is compared to a file pattern to calculate a match score. Generally, the higher the score, the more likely the sample and file pattern are from the same individual. Match scores and estimates of the quality of each sample (local quality) are fused in the BBN to generate probability densities for identity (ID) and global quality (GQ). Local and global quality will be discussed in the next section.

A Bayesian belief net (F. V. Jensen, Bayesian Networks and Decision Graphs, Springer, New York, 2001) is a compact, graphical representation of a probability distribution P $(X_1, \ldots, X_n)$ and is uniquely determined by the factorization $$P(X_1, \ldots, X_n) = P(X_n) \prod_{i=1}^{n} P(X_i | \text{parents}(X_i)),$$

where parents$(X_i)$ denotes the random variables on which $X_i$ is conditioned. The net consists of a set of vertices, or nodes, corresponding to the random variables, and a set of directed edges between pairs of vertices that together form a directed acyclic graph in which the directed edges going into the node corresponding to $X_i$ are precisely the parents of $X_i$. Nodes without parents are called root nodes. The definition is completed by specifying the conditional distributions $P(X_i | \text{parents}(X_i))$ and the a priori probability densities for the root nodes.

Figure 2:
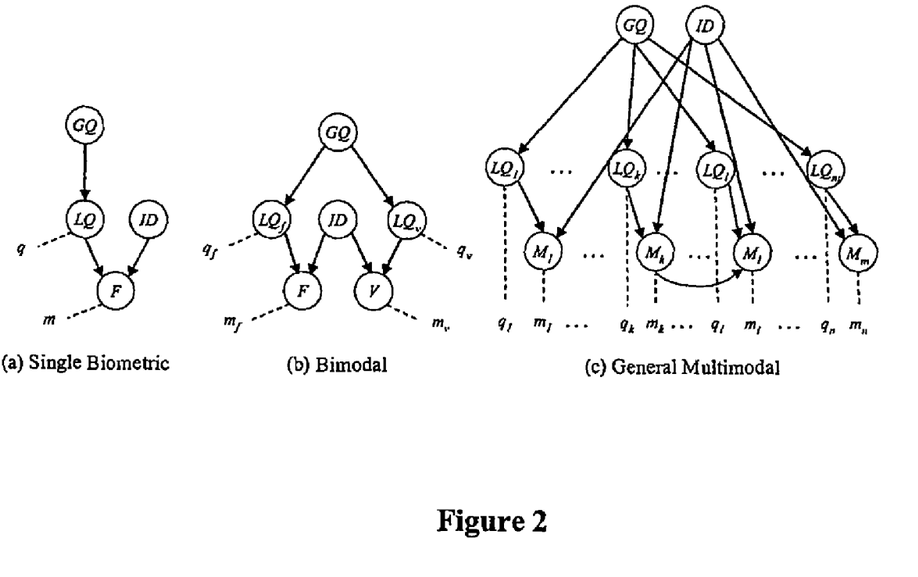
FIG. 2(a) illustrates a model in accordance with the present invention for fusing match score and quality for a single biometric (e.g., multiple fingerprints)
FIG. 2(b) illustrates the simple net expanded for fingerprint and voice fusion, assuming finger and voice modalities are conditionally independent given ID.
FIG. 2(c) illustrates extending the net to incorporate additional modalities, dependencies between modalities, and conditioning variables.

FIG. 2(a) illustrates a model in accordance with the present invention for fusing match score and quality for a single biometric (e.g., multiple fingerprints). The three lower nodes model the joint distribution of the variables M (match score), ID (Match or Non-match), and LQ (quality estimates represented by integers 1, 2, . . . , 5).

$$P(M,ID,LQ) = P(M|ID,LQ) \cdot P(ID) \cdot P(LQ)$$

Given a match score, m, and quality estimate, q, the identity distribution is updated to $$P_{update}(ID) = P_{prior}(ID) \left[ \frac{P(M=m|ID, LQ=q)P(LQ=q)}{P(LQ=q) \cdot \sum_{ID} P(M=m|ID, LQ=q)} \right].$$

It follows that $$\frac{P_{update}(ID=0)}{P_{update}(ID=1)} = \left[ \frac{P_{prior}(ID=0)}{P_{prior}(ID=1)} \right] \cdot \left[ \frac{P(M=m|ID=0, LQ=q)}{P(M=m|ID=1, LQ=q)} \right];$$

and if the priors are uniform, this reduces to a simple likelihood ratio conditioned on quality.

Likelihood ratios have been used for score fusion (S. Prabhakar, and A. K. Jain, *Decision-level fusion in fingerprint verification*, Pattern Recognition, 35 (2002) 861-874). The BBN of the present invention extends this by incorporating unequal priors when they are available.

A further extension is the introduction of a global quality variable intended to measure the quality of the fused solution and to be used as a confidence measure in conjunction with $P_{update}$(ID) for decision making. Since GQ and LQ should display the same trend, the joint probability density P(LQ, GQ) should have the line GQ=LQ as its dominant axis. Then the conditionals, P(LQ|GQ), are normalized cross sections through P(LQ, GQ) parallel to the LQ axis. Our initial definition is P(LQ, GQ)∝exp{(LQ−GQ)$^2$/2σ$^2$}, where the constant of proportionality is chosen so that $\Sigma_{LQ,GQ}$P(LQ, GQ)=1. The smaller σ is, the stronger the linearity between GQ and LQ. Future work will investigate alternative definitions. When GQ is included, the net update equations are $$P_{update}(ID) = \qquad (i)$$

$$P_{prior}(ID)\left[\frac{P(M=m|ID, LQ=q)\sum_{GQ} P(LQ=q|GQ)P_{prior}(GQ)}{Norm_{ID}}\right]$$

$$P_{update}(GQ) = \qquad (ii)$$

$$P_{prior}(GQ)\left[\frac{P(LQ=q|GQ)\sum_{ID} P(M=m|ID, LQ=q)P_{prior}(ID)}{Norm_{GQ}}\right]$$

where the normalizations ensure $P_{update}$(ID) and $P_{update}$(GQ) are probabilities. Note that the summation in (i) is just P(LQ=q) and therefore $P_{update}$(ID) is the same as before.

This simple net is expanded in FIG. 2(b) for fingerprint and voice fusion, assuming finger and voice modalities are conditionally independent given ID. Additional modalities, dependencies between modalities, and conditioning variables (e.g., the scores might be conditioned on finger type as well as identity and quality) can be incorporated by extending the net as in FIG. 2(c). With increasing complexity, the update equations may no longer be analytically tractable; consequently, their evaluation would require an optimal procedure such as the junction tree algorithm (e.g., see F. V. Jensen, supra). A potentially more significant factor limiting net refinement, however, is lack of sufficient training data to determine the additional conditional probabilities.

There are various ways to implement the architecture. For example, a sequence of independent sample sets can be processed, using $P_{update}$(ID) and $P_{update}$(GQ) as priors for updating the following sample (the loop in FIG. 1). Sequential processing is advantageous in that it can be terminated once a decision threshold has been exceeded. In addition, if, at a particular time, measurements for some modalities are unavailable, the BBN can update with those that are at hand and the remaining modalities can be processed when (or if) samples are obtained. Decision processing is discussed in greater detail below.

In accordance with a particular embodiment of the present invention, the fingerprint quality measure defined by Tabassi, et al., supra, is used to be a predictor of matcher performance; i.e., a pair of good quality prints will have a high match score if and only if they are from the same subject. Five quality levels are used (1 is the highest, 5 the lowest), although, in principle, their method can be refined to any number.

Voice quality is based on the NIST Speech Quality Assurance algorithm (SPQA) (National Institute of Standards and Technology (NIST) Speech Quality Assurance (SPQA) Package 2.3 Documentation. The waveform is segmented into 20 ms windows with a 10 ms overlap. RMS power for each window is placed into a histogram in logarithmic decibel form. Since speech generally has higher RMS power than background, this histogram tends to have two modes. The lower-power mode is fit to a raised-cosine. Amplitude, center, and width were fitted by a direct-search algorithm, with the RSS of the difference between the raised-cosine and the data points as the objective function. The raised-cosine is subtracted from the histogram and the speech level set at the 95th percentile of the remaining histogram. The voice quality metric is the speech level minus the fitted distribution mean. It ranges from 6 to 25 db, larger values corresponding to higher quality.

TABLE 1

Gaussian Parameters for Fingerprint and Voice Local Quality Conditional Distributions

| | P(LQ$_f$|GQ) | | P(LQ$_v$|GQ) | |
|---|---|---|---|---|
| GQ | μ | σ | μ | σ |
| 1 | 1 | 2.78 | 24 | 8 |
| 2 | 2 | 2.78 | 20 | 8 |
| 3 | 3 | 2.78 | 16 | 8 |
| 4 | 4 | 2.78 | 12 | 8 |
| 5 | 5 | 2.78 | 8 | 8 |

Finally, the local quality conditionals P(LQ|GQ) can now be defined so that local and global qualities have the same value range and P(LQ|GQ)∝exp{(LQ−μ)$^2$/2σ$^2$}, where the parameters μ and σ are listed in Table 1. The values of σ have been chosen so that LQ and GQ are not too strongly bound.

For fingerprints, the applicant herein used the National Institute of Standards and Technology (NIST) Special Database 14, Version 2 (C. Watson, NIST Special Database 14: 8-bit Gray Scale Images of Mated Fingerprint Card Pairs 2, CD-ROM & Documentation, 1993), consisting of two 10-print cards, labeled File and Search, from 2700 individuals. A training set was selected consisting of data from 736 individuals selected to include approximately equal numbers from each quality level. Otherwise the training set was random. The test set consisted of the remaining 1,962 individuals. (Two individuals were not processed due to an abnormal program termination.) Because of computational constraints only 477,400 of the 1962×1961 total imposter scores were used in the order in which they appeared in the database.

Figure 3:
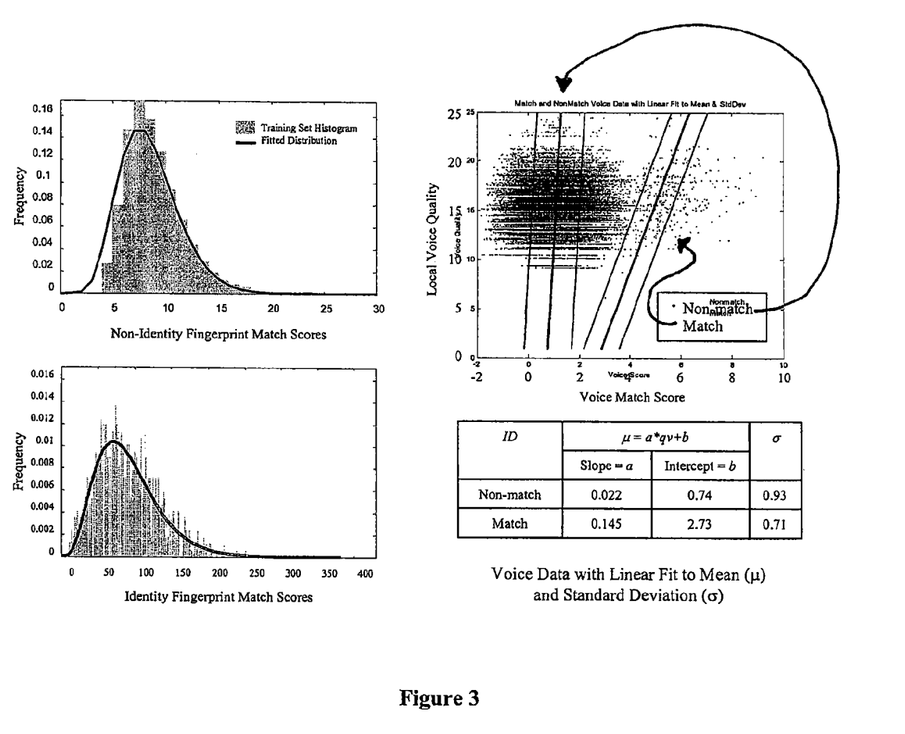
FIG. 3 is a series of graphs showing the determination of match score distributions conditional on identify and local quality.

The Bozorth3 matcher (C. Watson, NIST Fingerprint Image Software 2 (NFIS2), Rel. 28-2.2, CDROM and documentation, 2004) was used to calculate match-scores and the NIST Fingerprint Image Software 2 (Watson, supra) to calculate local quality. To estimate P(M|ID, LQ) the match score training data were divided into 10 histograms conditioned on ID and LQ (LQ is the maximum of the search and file quality scores). These were not further segregated by finger, although this refinement is contemplated by the applicant herein. Applicant found gamma distributions $$P(F|LQ, ID=1) = \frac{1}{b^a\Gamma(a)}x^{a-1}e^{-x/b}$$

fit the true match histograms best, where a and b were determined so the analytic distribution means and standard deviations coincide with the histogram means and standard deviations. Wein and Baveja, supra also use gamma distributions for true match scores, and log normal for non-match scores. Furthermore, they provide derivations supporting these choices. Therefore, the applicant herein also used log-normal distributions for non-match distributions:

$$P(F|LQ, ID = 0) = \frac{1}{b\sqrt{2\pi}\, x} e^{-\frac{1}{2}\left(\frac{\log(x)-a}{b}\right)^2},$$

where a and b are again determined so that analytic means and standard deviations coincide with histogram means and standard deviations. FIG. 3 compares the analytic curves to histograms.

Applicant used voice data from the XM2VTS database (K. Messer, J. Matas, J. Kittler, J. Luettin, and G. Maitre, "XM2VTSdb: The Extended M2VTS Database, in: Proceedings $2^{nd}$ Conference on Audio and Video-based Biometric Personal Identification (AVBPA99)," Springer Verlag, New York, 1999. CVSSP, containing 24 utterances from 295 individuals. Each individual was recorded in four sessions, each session consisting of two accesses, comprised of three utterances. Poh (N. Poh and S. Bengio, Database, Protocol and Tools for Evaluating Score-Level Fusion Algorithms in Biometric Authentication, IDIAP Research Report 04-44, 2004, AVBPA2005 pp. 1059-1070) segregated the individuals into sets of 200 clients, 25 evaluation imposters, and 70 testing imposters. Applicant herein used four of the eight client accesses per individual for training, two accesses for development (fine tuning) against the 25 evaluation imposters, and two accesses for testing against the 70 testing imposters. Development data (400 client and 40,000 imposter access attempts) were used to train the BBN, and performance was evaluated against testing data (400 client and 112,000 imposter access attempts).

Client (matching) voice data came from 200 individuals, with 2 voice accesses from each for a total of 400 match cases. Voice imposter scores were selected from a separate database of 70 imposters each with 8 access attempts against each of the 200 client templates, yielding 112,000 non-match cases. Ideally, a multimodal study would use voice and fingerprint data from the same set of individuals, but such correlated databases tend to be small. Therefore, virtual individuals were created by combining voice and fingerprint data. Furthermore, in order to obtain adequate statistics, the 400 voice matching scores were used multiple times to fill out the matching database to the available 1,962 fingerprint matching cases. False match rates based on this data set should be conservative since composite individuals who are assumed to be different actually share the same voice data, resulting in more false matches.

Correlations that may exist between fingerprints and voice are not represented. Given correlated modalities, the fusion results may change, but the fundamental BBN technique is still valid. If such correlations exist, they can be modeled by placing the appropriate conditional links in the BBN.

The applicant herein used linear filter-bank cepstral coefficient speaker identification matching scores, and local quality estimates generated as described above. Each access quality was computed as the mean of the three constituent utterance qualities. Match quality was defined to be the minimum of the qualities of the two matched accesses. The voice data used to define the conditional probabilities P(V|ID, LQ) are plotted on the right side of FIG. 3. These data were fitted by a Gaussian model. The lines are fits to the means and standard deviations corresponding to cross-sections through quality. For example, if ID=1 and $LQ_v$=15, then µ=0.145·15+ 2.73=4.9 and so P(V|ID=1, LQ=15)∝N(4.9, $0.71^2$).

Figure 4:
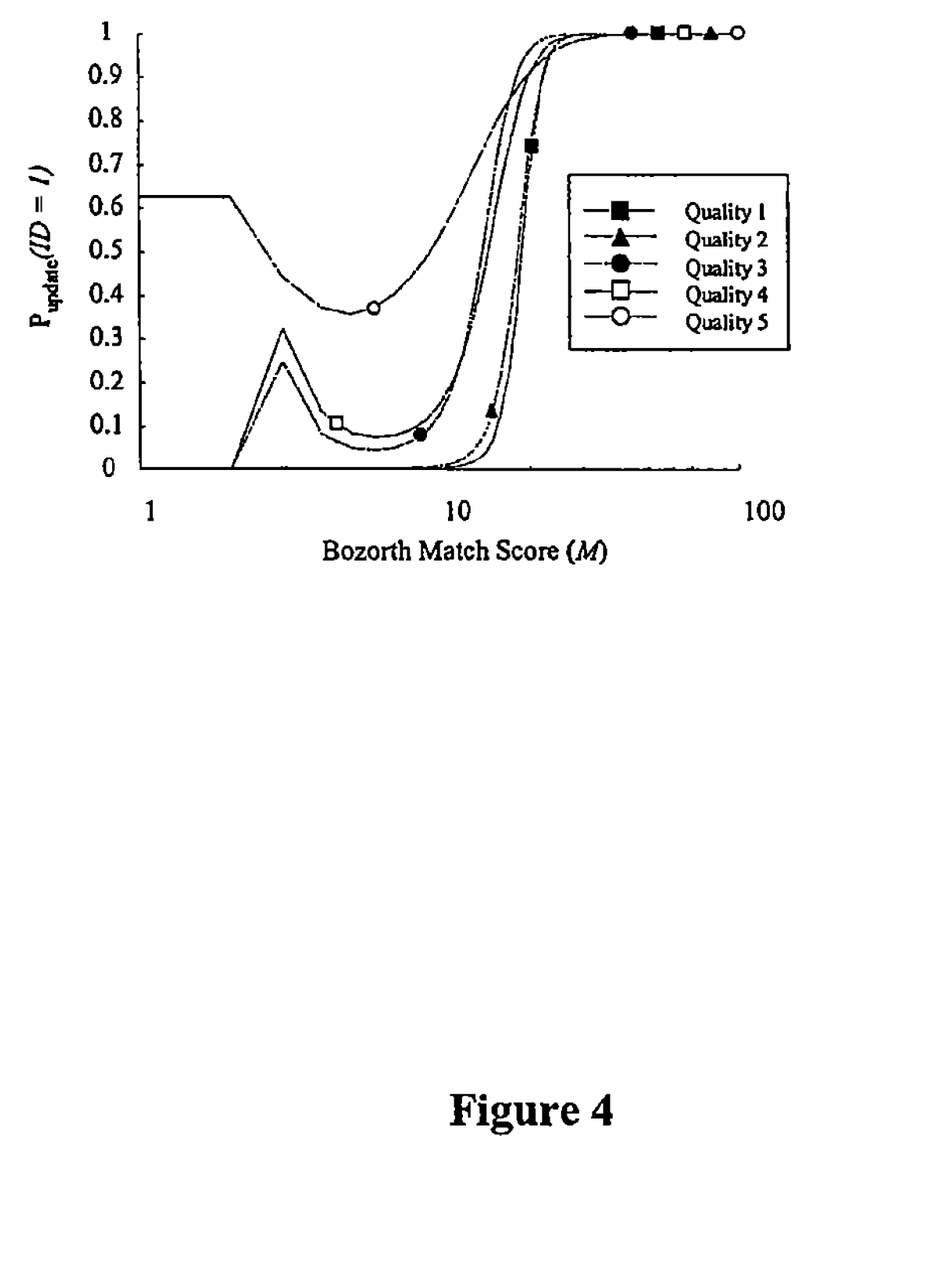
FIG. 4 illustrates fingerprint BBN response curves.

The curves in FIG. 4 demonstrate that even for the lowest quality a high match score yields a high probability of identity, but a low-quality, low score is unreliable as an indication of a non-match condition. Consequently, useful information can be extracted from low quality prints and should not be thrown out summarily.

Figure 5:
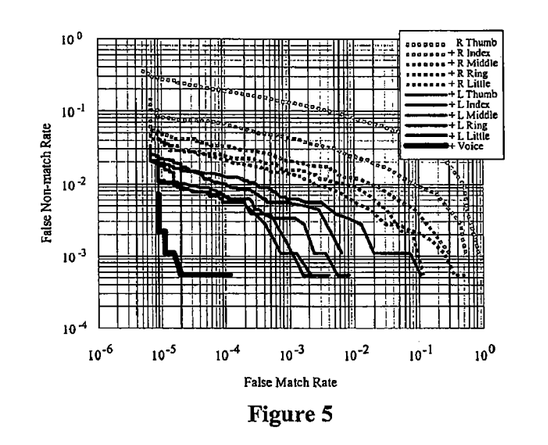
FIG. 5 illustrates DET curves for index fingers and voice.
Figure 6:
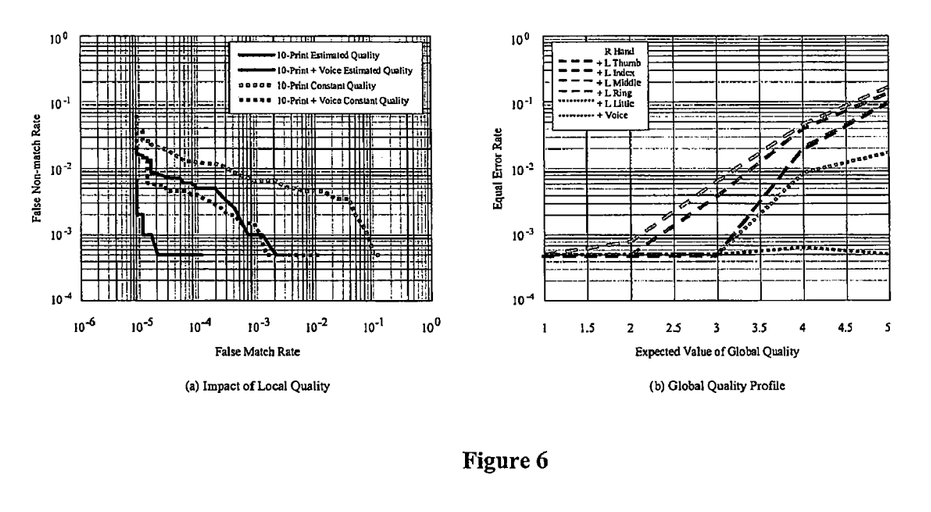
FIGS. 6(a) and 6(b) are graphs showing the effect of quality on performance.

In the experiments performed by the applicant, applicant began with uniform priors for P(ID) and P(GQ). Ten fingerprint pairs were processed sequentially, starting with the right thumb and ending with the left index finger, and finally a voice sample was processed. The distributions $P_{update}$(ID) and $P_{update}$(GQ) were used as the priors for the next update. Performance results are shown in FIGS. 5 and 6. The lower limit on the false non-match rate is 1/1962≈2×$10^{-5}$ and the lower limit on the false match rate is 1/477400≈2×$10^{-6}$. These results may be slightly pessimistic in that N-fold cross-validation was not performed (T. Scheffer, R. Herbrich, *Unbiased Assessment of Learning Algorithms*, in Proceedings of the Fifteenth International Joint Conference on Artificial Intelligence (pp. 798-903)). The test data was also processed with artificially fixed values of $LQ_f$=2 and $LQ_v$=20 to neutralize quality. FIG. 6(a) compares these results to those conditioned on quality. Clearly, using quality resulted in a significant performance improvement. With the inclusion of voice, the BBN performance is near the resolution limits of the processed data.

TABLE 2

| | | | | | Global Quality for the False Non-match Case | | | | |
|---|---|---|---|---|---|---|---|---|---|
| | Match | | | | | Distribution of GQ | | | |
| Finger | Score | LQ | P(ID = 0) | P(ID = 1) | 1 | 2 | 3 | 4 | 5 |
| 1 | 6 | 3 | 0.9614 | 0.0386 | 0.1941 | 0.2029 | 0.2060 | 0.2029 | 0.1941 |
| 2 | 6 | 3 | 0.9863 | 0.0137 | 0.1056 | 0.1494 | 0.1992 | 0.2501 | 0.2959 |
| 3 | 6 | 3 | 0.9994 | 0.0006 | 0.1024 | 0.1516 | 0.2052 | 0.2537 | 0.2871 |
| 4 | 6 | 3 | 1.0000 | 0.0000 | 0.0993 | 0.1537 | 0.2112 | 0.2573 | 0.2784 |
| 5 | 14 | 3 | 1.0000 | 0.0000 | 0.0692 | 0.1274 | 0.2023 | 0.2761 | 0.3249 |
| 6 | 18 | 3 | 0.9999 | 0.0001 | 0.0672 | 0.1293 | 0.2083 | 0.2801 | 0.3152 |
| 7 | 4 | 4 | 0.9999 | 0.0001 | 0.0315 | 0.0821 | 0.1738 | 0.2978 | 0.4147 |
| 8 | 14 | 3 | 0.9999 | 0.0001 | 0.0307 | 0.0835 | 0.1795 | 0.3029 | 0.4034 |
| 9 | 4 | 3 | 1.0000 | 0.0000 | 0.0135 | 0.0496 | 0.1399 | 0.3010 | 0.4960 |
| 10 | 9 | 5 | 1.0000 | 0.0000 | 0.0056 | 0.0279 | 0.1036 | 0.2840 | 0.5789 |

FIG. 6(b) shows a strong positive correlation between global quality and the probability of identity error. This is not evident when the voice data is included because the equal rates are at the limits of the data. Table 2 lists fusion outputs for the only true match case misclassified by the fingerprint-only BBN as a non-match. The rows correspond to the right thumb through left index finger. Each row contains the match score and local quality for the corresponding finger and the fused ID and GQ distributions for all fingers up to and including the row. The scores are generally consistent with a non-match. Moreover, while the average of the local quality estimates is a little over three; only $P_{final}(GQ)$ is strongly skewed toward GQ=5, indicating potential unreliability in the data. Thus, Bayesian fusion resulting in global quality is a more sensitive confidence measure than a simple average of local qualities.

TABLE 3

Interpretation of $P_{final}$ (ID) and $P_{final}$ (GQ)

| Fused Solution | High Global Quality | Low Global Quality |
|---|---|---|
| $\rho \gg t$ | True Match | True Match |
| $\rho \ll t$ | True Non-match | unreliable |
| $\rho \approx t$ | ambiguous | unreliable |

Now, let $\rho=P(ID=1)P(ID=0)$ One method of decision making is based on comparing $\rho$ to a threshold, t, determined from the DET curves to yield an acceptable false alarm rate. There are two types of uncertainty: ambiguity, when the scores from a true match are similar to those expected from a non-match, and conversely; and unreliability, when all measurements point to one decision when, in fact, the opposite may be true. Based on applicant's analysis, these cases are summarized in Table 3.

Figure 7:
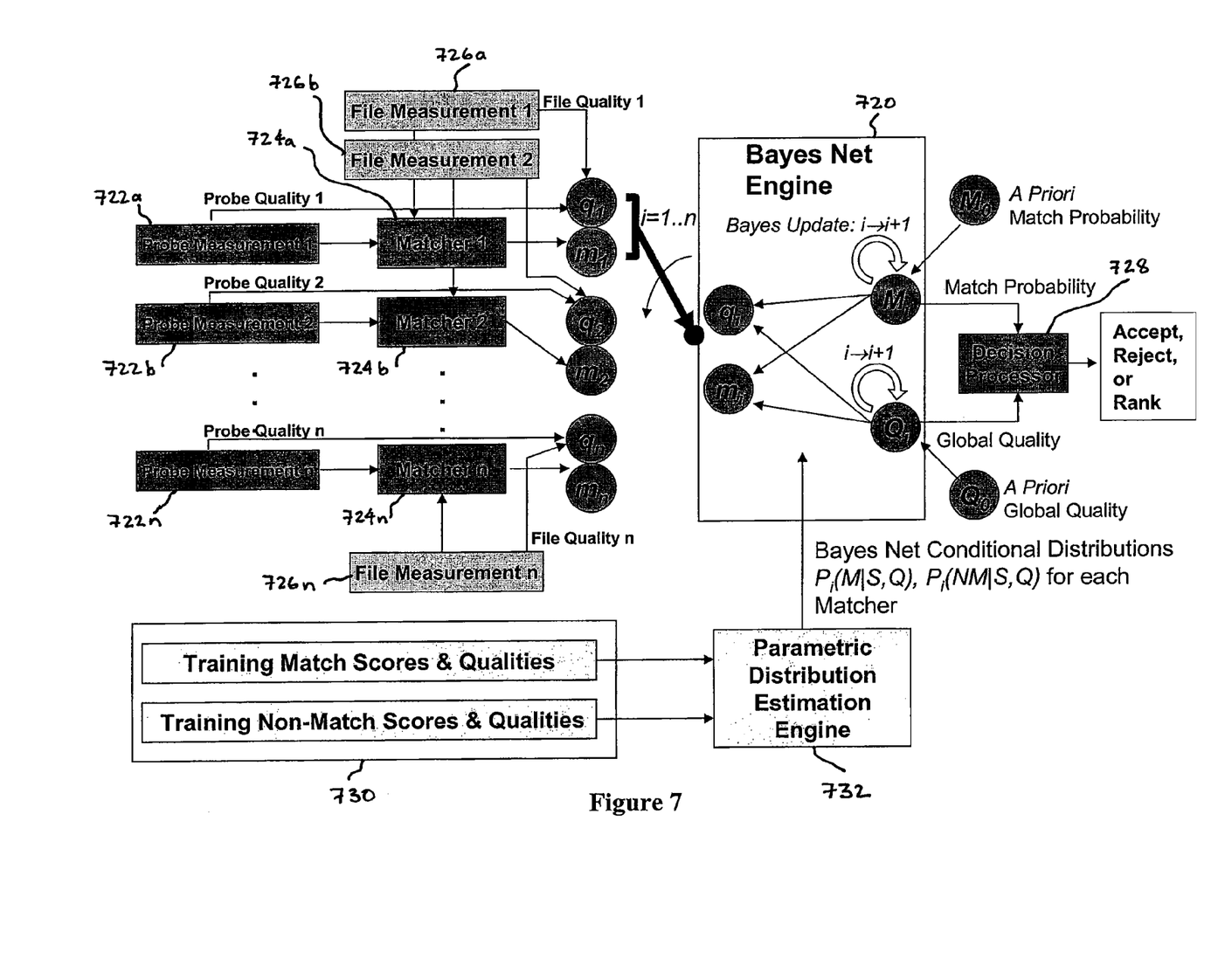
FIG. 7 is architecture drawn illustrating an example of the architecture of the present invention.

FIG. 7 is a simplified architecture diagram of an example of the architecture of the present invention. The architecture of FIG. 7 includes a Bayes Net Engine 720 having a match probability output and a global quality output, each of which are input to a decision processor 728. A measurement 722a is input to a matcher 724a. Measurement 722a represents, for example, a first measurement taken from a first biometric device or probe, e.g., an iris scan device or a fingerprint scanning device. Matcher 724a comprises an algorithm that determines the similarity between two measurements of the same modality. For example, fingerprint matchers may employ minutiae point-to-point matching or overall friction-ridge pattern matching. While the effectiveness of the overall biometric system can be improved with better matching algorithms, the intent of this invention is to improve the biometric system performance even with marginal matching performance from each modality. It is even possible to perform BBN-based fusion on the outputs of different matchers processing the same input data, though this would be most effective if the matching techniques so fused were fundamentally different in character.

A file measurement 726a is input to matcher 724a and comprises an entry from the gallery of 1 to N known individuals against which measurements from an unknown individual are compared. Additional measurements 722b, . . . 722n are input to matchers 724b, . . . 724n, each of which receive inputs from file measurements 726b, . . . 726n. The measurements 722a, 722b, . . . 722n can comprise multimodal or single mode measurements.

For each probe measurement 722a, 722b, . . . 722n, a probe quality value is generated in a well known manner. This probe quality value is a value indicative of a relative quality of the particular probe and/or the particular measurement being made by the probe. Similarly, for each file measurement 726a, 726b, . . . 726n, a file quality value is generated for each entry stored in the file measurement storage database. The file quality value is a relative value indicative of the quality of the particular entry.

A training block 730 is utilized to train the parametric distribution estimation engine 732 to develop the parametric distribution probabilities for the measuring devices that generate the probe measurements 722a, 722b, . . . 722n. The training process uses known "truth data" for each of the matchers. A sample set of known data is input to the training block 730 so that the characteristics of a known match of a particular quality, as well as a known non-match of a particular quality, can be characterized. The parametric distribution estimation engine 732 takes the training data and creates a probability density function which essentially allows a known match of a particular quality level for a particular matcher to be characterized, as well as known non-matches of various qualities for the same matcher to be characterized, formatted in the form of a probability density function.

Figure 8:
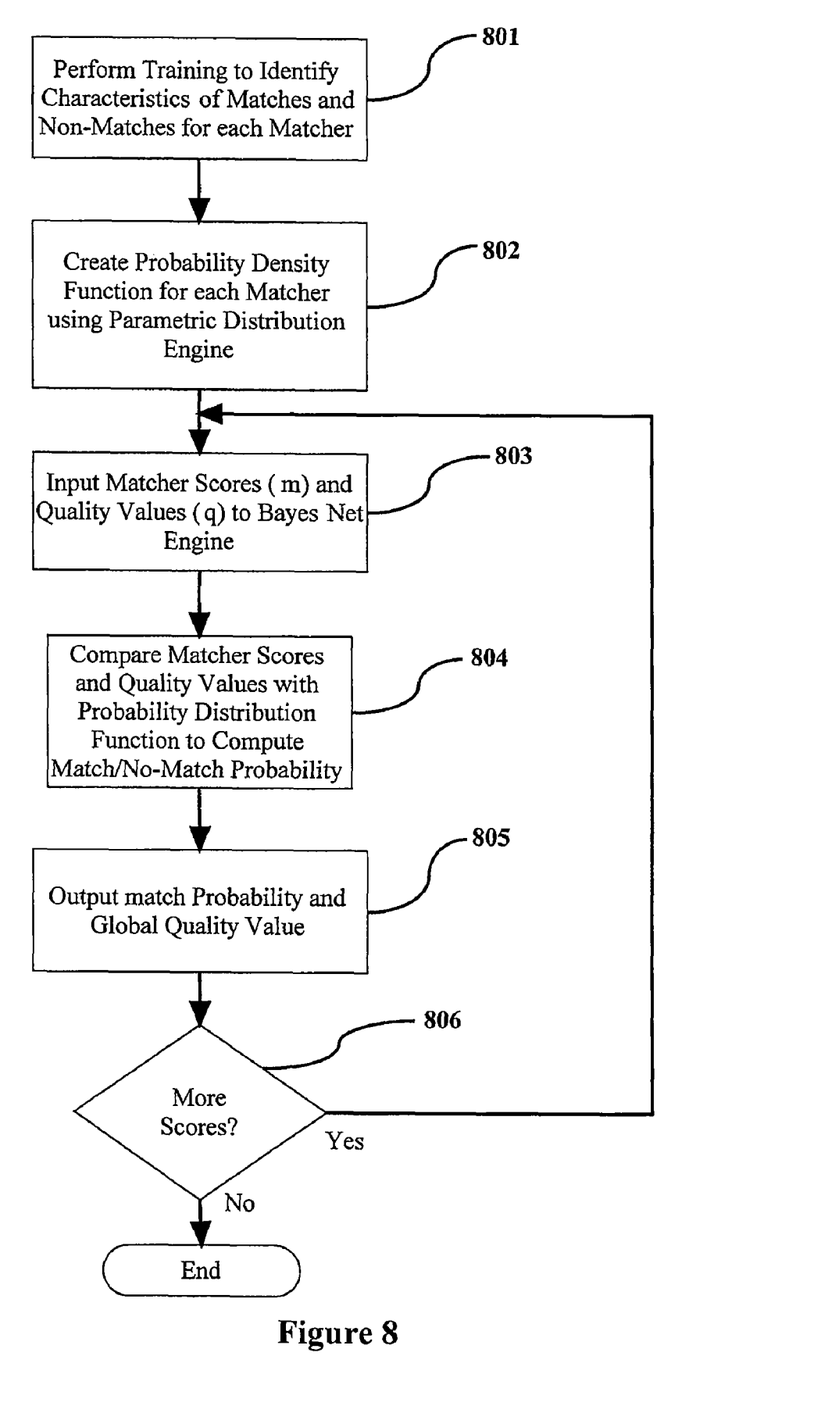
FIG. 8 is a flow diagram illustrating an example of steps performed using the architecture of the present invention.

FIG. 8 is a flowchart illustrating the steps performed by the architecture of FIG. 7. At step 801, training is performed, whereby parameters of empirical training data for each of the matchers (e.g., mean, standard deviation) are estimated via standard statistical formulas, e.g. mean of N scores is the sum of the scores divided by N. At step 802, parametric statistical conditional distributions are computed for match and non-match scores conditioned on each modality at various quality levels (e.g., Log-Normal, Beta distributions). These computed distributions are used in the update equations described previously in the Bayes Net 720. At step 803, the Bayes Net is updated via the update equations. At step 804, the measurements and quality estimates 722a, 722b, . . . 722n are processed sequentially or in parallel through the Bayes Net equations of Bayes Net engine 720 to compute the probability of a match (M) and global quality estimate (G). At step 805, the probability of match (M) and global quality (Q) computations are used to accept/reject matches (verifications function) or to rank search candidates (identification function). In the verification process, the global match probability and global quality estimate are processed by a decision engine which outputs discrete answers such as "Match", "Non-Match", or possibly "Indeterminate". In the identification process, a list of candidate matches from a gallery of known individuals are rank ordered and the top small number of candidates are marked for further consideration by an expert or secondary algorithm. Finally, at step 806, a determination is made as to whether or not there are more scores to be analyzed; if there are, the process reverts back to step 803, and if there are not, the process terminates.

The applicant's architecture provides a unified fusion framework for processing multiple biometrics and per-score quality estimates, resulting in significant performance improvement over constant-quality fusion. The architecture is expandable, allowing additional modalities and dependency relationships between variables. A Bayes Net allows several key features including 1) a consistent framework for fusing score-level information, 2) a mathematically sound incorporation of per-measurement quality data, 3) incorporation of a priori knowledge about match and non-match scoring statistics—enabling training on relatively sparse databases, 4) a natural method for normalizing scores from different biometric devices, and 5) the computation of a final-result quality metric indicating overall confidence in the measured data. In short, the Bayes Net takes all available data (scores, quality estimates, and a priori knowledge) into account when computing a final probability of a multi-biometric match. Comment: Is a "Bayesian Belief Network biometric fusion engine" as a "Bayes Net"? Please define Bayesian Belief Network and biometric fusion engine so that the claims are clearly supported; if Bayes Net is shorthand change accordingly.

The above-described steps can be implemented using standard well-known programming techniques. Software programming code which embodies the present invention is typically stored in permanent storage. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A method of performing multi-biometric fusion, comprising:
    configuring a Bayesian Belief Network (BBN) biometric fusion engine to receive biometric scoring and quality information regarding one or more subjects;
    computing parametric statistical conditional distributions corresponding to said biometric and quality information received by said BBN;
    computing, using said BBN, a probability of match and a global quality estimate for said biometric scoring and quality information based on said computed parametric statistical conditional distributions; and
    outputting from said BBN said computed probability of match and global quality estimate.

2. The method of claim 1, wherein said biometric scoring and quality information regarding one or more subjects comprises, for each subject:
    a match/no-match score for a first measured biometric characteristic;
    a quality value for said first measured biometric characteristic;
    a match/no-match score for a second measured biometric characteristic; and
    a quality value for said second measured biometric characteristic.

3. The method of claim 2, wherein said computed parametric statistical conditional distributions comprise:
    a first match/no-match probability distribution for training match scores corresponding to said first measured biometric characteristic at one or more levels of quality; and
    a second match/no-match probability distribution for training match scores corresponding to said second measured biometric characteristic at one or more levels of quality.

4. The method of claim 3, further comprising:
    fusing said first match/no-match probability distribution and said second match/no-match probability distribution, thereby computing said probability of match and a global quality estimate for said biometric scoring and quality information.

5. The method of claim 4, wherein said first biometric characteristic and said second biometric characteristic are different modalities.

6. The method of claim 4, wherein said first biometric characteristic and said second biometric characteristic are the same modality.

7. The method of claim 4, wherein the computed probability of match and global quality estimate output by said BBN is used to verify that the measured biometric characteristics correspond to previously-stored biometric data of one of said subjects.

8. The method of claim 4, wherein the computed probability of match and global quality estimate output by said BBN is used to identify one of said subjects.

9. The method of claim 1, wherein said method compares a first set of physical characteristics to one or more additional sets of physical characteristics.

10. The method of claim 9, wherein said first set of physical characteristics comprises one or more fingerprints, facial characteristics, iris scans, hand vein patterns, voice patterns, DNA, or combinations thereof.

11. The method of claim 10, wherein said additional sets of physical characteristics comprise one or more fingerprints, facial characteristics, iris scans, hand vein patterns, voice patterns, DNA, or combinations thereof.

12. The method of claim 10, wherein said first set of physical characteristics are stored in a database.

13. The method of claim 11, wherein said additional sets of physical sets of characteristics are stored in a database.

14. The method of claim 1, wherein said biometric scoring and quality information regarding one or more subjects comprises, for each subject:
    a match/no-match score for each measured biometric characteristic; and
    a quality value for said each measured biometric characteristic.

15. The method of claim 14, wherein said computed parametric statistical conditional distributions comprise:
    match/no-match probability distributions for training match scores corresponding to each measured biometric characteristic at one or more levels of quality.

16. The method of claim 15, further comprising:
    fusing said match/no-match probability distributions.

17. A multi-biometric fusion system, comprising:
    a Bayesian Belief Network (BBN) biometric fusion engine receiving biometric scoring and quality information regarding one or more subjects;
    a parametric distribution estimation engine, coupled to said BBN biometric fusion engine, computing parametric statistical conditional distributions corresponding to said biometric and quality information received by said BBN;

whereby said BBN biometric fusion engine:
receives said computed parametric statistical conditional distributions from said parametric distribution estimation engine and computes and outputs a probability of match and a global quality estimate for said biometric scoring and quality information based on said computed parametric statistical conditional distributions.

18. The system of claim 17, wherein said biometric scoring and quality information regarding one or more subjects comprises:
a first biometric match score for a first measured biometric characteristic;
a first biometric measurement quality value corresponding to said first measured biometric characteristic;
a second biometric match score corresponding to a second measured biometric characteristic; and
a second biometric measurement quality value corresponding to said second measured biometric characteristic.

19. A system for performing multi-biometric fusion, comprising:
means for configuring a Bayesian Belief Network (BBN) biometric fusion engine to receive biometric scoring and quality information regarding one or more subjects;
means for computing parametric statistical conditional distributions corresponding to said biometric and quality information received by said BBN;
means for computing, using said BBN, a probability of match and a global quality estimate for said biometric scoring and quality information based on said computed parametric statistical conditional distributions; and
means for outputting from said BBN said computed probability of match and global quality estimate.

20. The system of claim 19, wherein said biometric scoring and quality information regarding one or more subjects comprises, for each subject:
a match/no-match score for a first measured biometric characteristic;
a quality value for said first measured biometric characteristic;
a match/no-match score for a second measured biometric characteristic; and
a quality value for said second measured biometric characteristic.

21. The system of claim 20, wherein said computed parametric statistical conditional distributions comprise:
a first match/no-match probability distribution for training match scores corresponding to said first measured biometric characteristic at one or more levels of quality; and
a second match/no-match probability distribution for training match scores corresponding to said second measured biometric characteristic at one or more levels of quality.

22. The system of claim 21, further comprising:
means for fusing said first match/no-match probability distribution and said second match/no-match probability distribution, thereby computing said probability of match and a global quality estimate for said biometric scoring and quality information.

23. The system of claim 22, wherein said first biometric characteristic and said second biometric characteristic are different modalities.

24. The system of claim 22, wherein said first biometric characteristic and said second biometric characteristic are the same modality.

25. The system of claim 22, wherein the computed probability of match and global quality estimate output by said BBN is used to verify that the measured biometric characteristics correspond to previously-stored biometric data of one of said subjects.

26. The system of claim 22, wherein the computed probability of match and global quality estimate output by said BBN is used to identify one of said subjects.

* * * * *